March 29, 1960 E. G. VOGL 2,930,571
ELECTRICALLY OPERABLE VALVE CONTROL MECHANISM
Filed Jan. 12, 1959 4 Sheets-Sheet 1

INVENTOR.
EDWIN G. VOGL
BY
ATTY.

INVENTOR.
EDWIN G. VOGL
BY
ATTY.

March 29, 1960
E. G. VOGL
2,930,571
ELECTRICALLY OPERABLE VALVE CONTROL MECHANISM
Filed Jan. 12, 1959
4 Sheets-Sheet 3
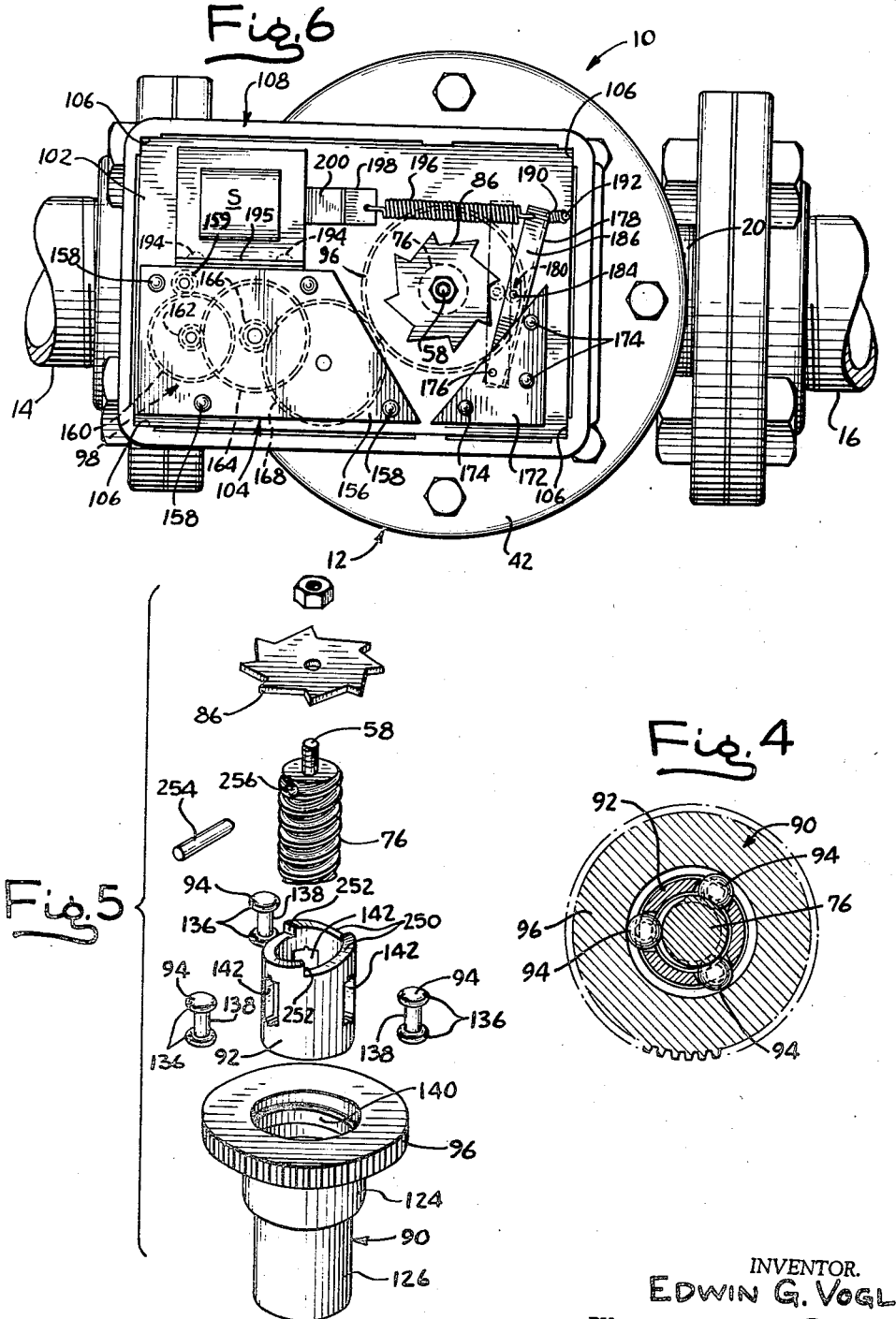
INVENTOR.
EDWIN G. VOGL
BY
ATTY.

March 29, 1960     E. G. VOGL     2,930,571
ELECTRICALLY OPERABLE VALVE CONTROL MECHANISM
Filed Jan. 12, 1959     4 Sheets-Sheet 4

INVENTOR.
EDWIN G. VOGL
BY
ATTY.

United States Patent Office 2,930,571
Patented Mar. 29, 1960

2,930,571

ELECTRICALLY OPERABLE VALVE CONTROL MECHANISM

Edwin G. Vogl, Rockford, Ill., assignor to Eclipse Fuel Engineering Co., Rockford, Ill., a corporation of Illinois Application January 12, 1959, Serial No. 786,152

7 Claims. (Cl. 251—69)

The improved control mechanism comprising the present invention has been designed for use primarily in connection with valve operation wherein it is desired to effect movement of a valve element between open and closed positions. More specifically, the control mechanism is concerned with a motorized valve of the type commonly employed for controlling the flow of a combustible fluid, for example, fuel gas, to the combustion chamber of a furnace or other apparatus where combustion takes place, and wherein the movable valve element is moved to an open position under the control of a motor and against the action of a biasing means and is maintained in such open position either upon continued energization of the motor itself or by some auxiliary biasing means. Valves of this type, being biased toward a closed or safe position, serve to shut off the flow of the combustible fluid to the combustion chamber in the event of a power failure, the attainment of an unusually high temperature in the vicinity of or within the combustion chamber, or the occurrence of an otherwise unsafe condition. Toward this end, such valves may be actuated under the control of a thermostat, a limit switch, electronic device, or by any suitable instrumentality which is capable of rendering the necessary initiating valve-closing impulse when the unsafe condition obtains. The invention is, however, capable of a wide variety of other uses and control mechanisms constructed in accordance with the principles thereof may be employed for moving a motor-actuated element from a first safe position to a second active position and for returning the same to its safe position when an unsafe condition arises. Irrespective, however, of the particular use to which the present invention may be put, the essential features thereof are at all times preserved.

It is among the principal objects of the present invention to provide a novel form of actuating means for a movable valve element associated with a valve assembly whereby the element may be moved from its closed or safe position to its open or active position at a uniform and relative slow rate of movement so that there will be no surging of the fluid through the valve upon initial opening thereof, together with means whereby when an unsafe condition obtains as outlined above, the valve may be rapidly returned to its closed or safe condition.

Another object of the invention is to provide such a novel control mechanism or actuating means wherein the movable biased valve element is moved from its closed to an open position under the control of an electric motor which when the valve element attains such open position, or moves through any predetermined degree of opening movement for which the mechanism is set, becomes deenergized, while at the same time an auxiliary holding means becomes effective to maintain the valve element in such open position until such time as a power failure or other unsafe condition obtains, whereupon the holding means is released and is rendered ineffective to maintain the valve element open.

A more specific object of the invention in an apparatus of the character briefly outlined above wherein the actuating means is in the form of a power train extending between an electric motor and the valve element, and which includes an anti-friction bearing screw and nut assembly and wherein the holding means is in the form of a solenoid-actuated clutch device, the latter serving when energized to maintain the nut component of the bearing screw assembly stationary so that the motor may rotate the screw and bring the valve element to its open position, means being provided whereby when the valve element attains such open position, the motor becomes deenergized so that the valve element is held in its open position without load on the motor.

Yet another object of the invention is to provide an apparatus of this sort wherein novel and effective means are provided for damping any shock, rebound or other reaction to final seating of the valve element at the time the same moves to its final closed position.

The provision of a valve control mechanism which is extremely compact in its design and which, therefore, consumes but little space, considering the capacity of the largest valve construction which may be accommodated thereby; one which is relatively simple in its construction and which, therefore, is unlikely to get out of order; one which is rugged and durable and which, therefore, is possessed of a relatively long life; one which is capable of ease of assembly and disassembly for purposes of inspection of parts, replacement or repair thereof; one which is smooth and silent in its operation; and one which otherwise is well adapted to perform the services required of it, are further desiderata which have been borne in mind in the production and development of the present invention.

Other objects and advantages of the invention not at this time enumerated, will become more readily apparent as the following description ensues.

In the accompanying four sheets of drawings forming a part of this specification one illustrative embodiment of the invention has been shown.

In these drawings:

Fig. 4 is a sectional view taken substantially along the line 4—4 of Fig. 3;

Fig. 5 is a fragmentary enlarged exploded view of a portion of the bearing screw construction shown in Fig. 3;

Fig. 6 is a top plan view of the apparatus shown in Fig. 2; and

Figure 1:
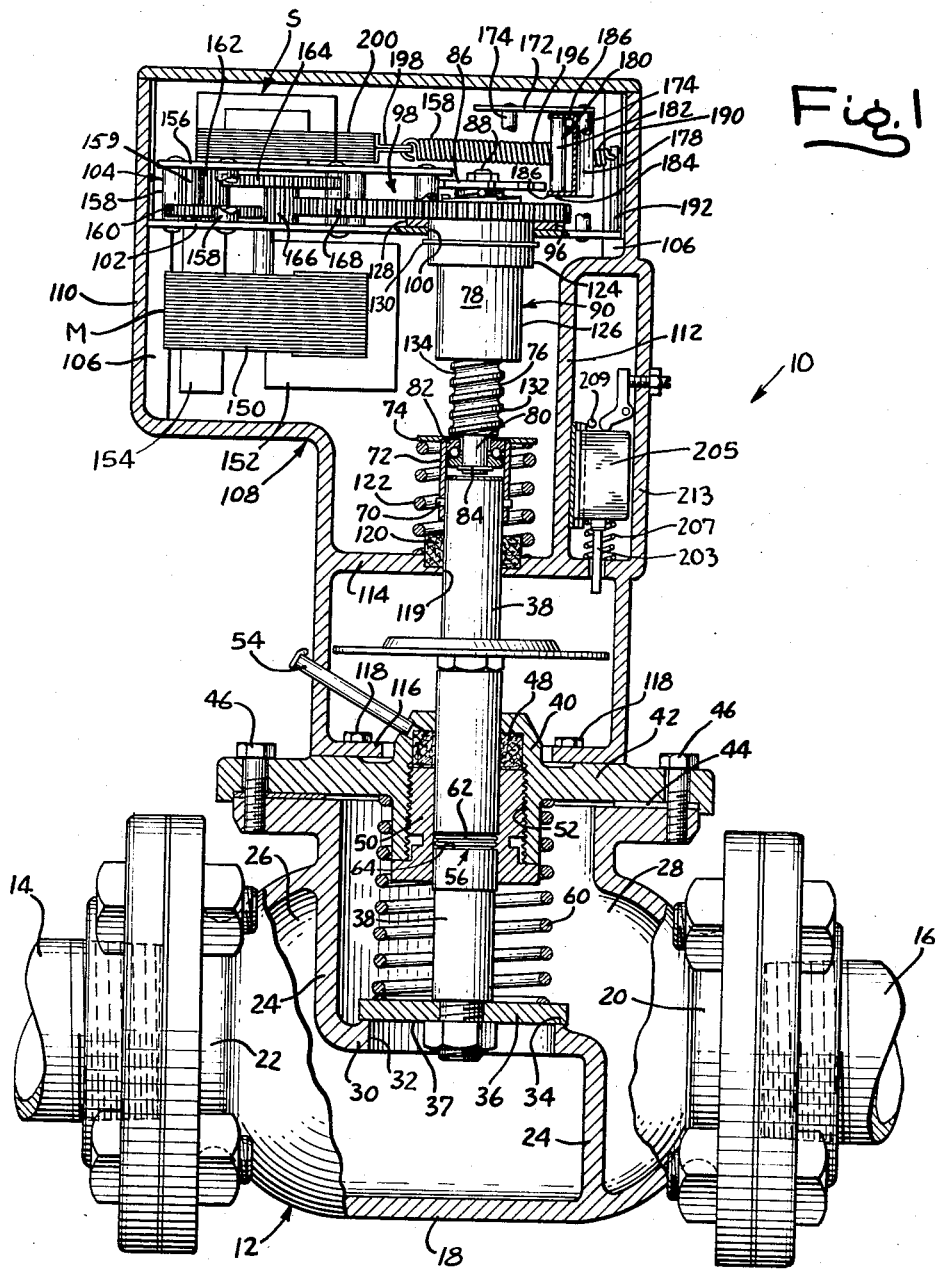
Fig. 1 is a side elevational view, partly in section, of a valve assembly showing the improved control mechanism operatively applied thereto with the valve being shown in its closed position.
Figure 2:
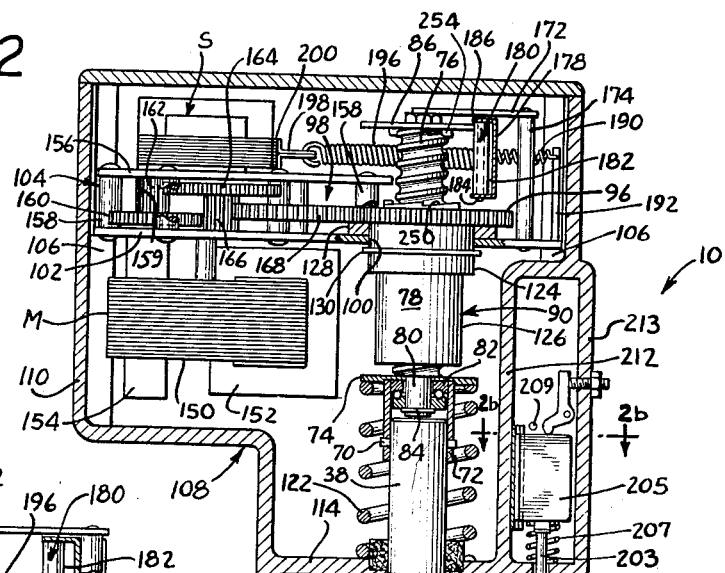
Fig. 2 is a side elevational view, similar to Fig. 1, showing the valve in its open position.

Referring now to the drawings in detail and in particular to Figs. 1 and 2, the control mechanism of the present invention has been designated in its entirety at 10 and is shown as being operatively applied to a valve 12 of more or less conventional design, the valve in the illustrated form of the invention being adapted to conduct a fluid such as fuel gas from a conduit 14 leading to a source of such gas to a conduit 16 leading to a burner or other fuel injection device associated with a furnace, a mixing device for fuel gas and air or similar furnace instrumentality. The valve 12 includes the usual valve casing 18 having an outlet port 20 and an inlet port 22. A transverse partition wall 24 divides the interior of the casing 18 into inlet and discharge chambers 26 and 28, respectively.

The partition wall 24 is formed with a horizontal ledge portion 30 having an opening 32 therethrough, the upper rim of which opening constitutes a valve seat 34 against which a valve element proper 36 in the form of a disc having a valve facing 37 thereon is adapted to seat. The valve element 36 is provided with a valve stem 38 which projects upwardly through a packing gland 40 provided in the valve cover plate 42. An annular gasket 44 is interposed between the valve body 18 and cover plate 42 and a series of clamping bolts 46 maintain these parts in their assembled relationship. The packing gland 40 includes the usual gland proper 48 and a packing nut 50 which is threadedly received in the gland socket 52. Lubricants may be applied to the gland through a channel 54.

A spring 60 surrounds the packing gland 40 and urges the valve disc 36 into engagement with its seat 34. The packing gland instrumentalities described above constitute a guard sleeve for the valve stem 38. An O-ring 62, seated within a groove 64, effects a seal between the packing nut 50 and the valve stem 38.

Still referring to Figs. 1 and 2, the upper end region of the valve stem 38 has pinned thereto as at 70 a cylindrical sleeve 72. The sleeve 72 projects upwardly beyond the upper end of the valve stem 38 and carries at its upper end a thrust washer 74. A bearing screw proper 76 associated with an anti-friction bearing screw assembly 78, the nature and function of which will be made clear presently, has a lower reduced end 80 which projects downwardly through the washer 74 and through an anti-friction bearing 82 which is retained in position on the reduced end of the bearing screw by means of a retaining ring 84. The bearing screw 76 which functions as a feed screw is thus rotatably connected to the valve stem 38 in axial alignment therewith. The upper end of the feed screw carries a ratchet wheel 86 (see also Fig. 6) which is anchored in position on the end of the feed screw by a clamping bolt 88. The nature and function of the ratchet wheel 86 will be set forth presently.

Figure 3:
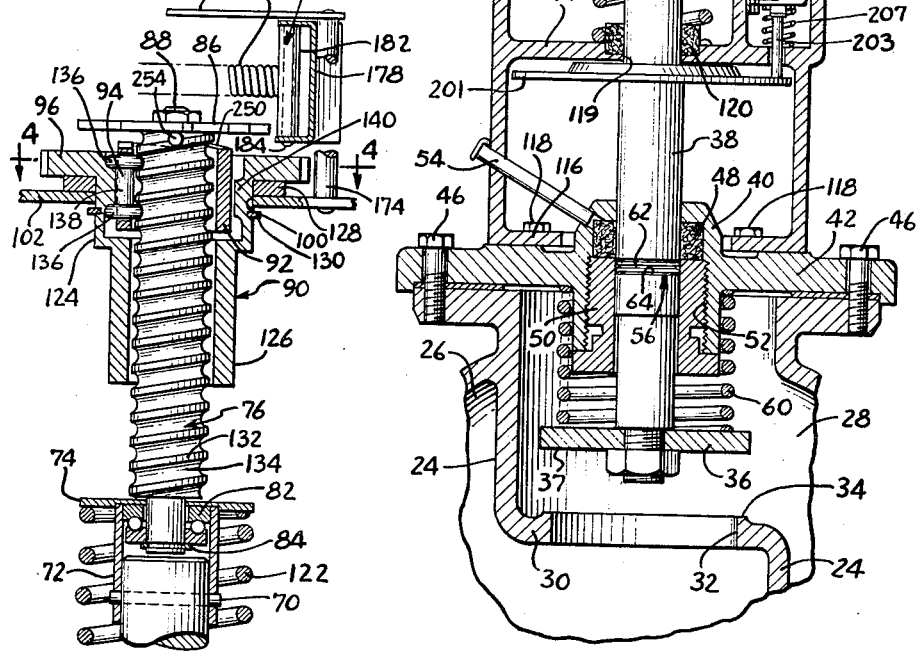
Fig. 3 is an enlarged fragmentary sectional view taken substantially centrally and vertically through an anti-friction bearing screw construction employed in connection with the present invention and showing the same operatively connected to certain adjacent parts.
Figure 2B:
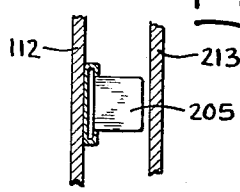
Fig. 2b is a sectional view taken substantially along the line 2b—2b of Fig. 2.

The bearing screw assembly 78 is a commercial unit available on the market and which has been modified according to the present invention so that it may, in the present valve control assembly, serve its intended purpose which is to raise and lower the valve stem 38 and thus effect opening and closing movements of the valve disc 36 against its seat 34. Accordingly, as best seen in Figs. 3, 4 and 5, the assembly 78 involves in its general organization four principal parts including the previously mentioned feed screw 76, a nut 90, a bearing cage 92, and a series of roller bearings 94. While three such roller bearings have been illustrated herein, it will be understood that a greater number of such roller bearings may be employed if desired.

Several anti-friction bearing screw units or assemblies are available for modification according to the present invention, one such unit being manufactured by the Anderson Company of Gary, Indiana, and sold under the trade name "Roton." Another such anti-friction bearing unit is manufactured by General Motors Corporation of Detroit, Michigan, and sold under the trade name "Saginaw Ball Bearing Screw." The particular anti-friction bearing screw illustrated herein is a modified form of the "Roton" anti-friction bearing screw. The operating principle of such a bearing screw is extremely simple and resides principally in the fact that the anti-friction roller bearing units are spaced and caged between the threaded race of the feed screw and an internally grooved nut which serves as an outer race. As the nut and screw are rotated relative to each other, the bearings engage both the screw and the nut so that the bearings roll on both these members to provide individual rotation of the bearing units and planetation thereof about the axis of the feed screw. If rotary motion or torque is applied to the screw while the nut is held against rotation, the nut will be driven linearly along the axis of the screw. If the screw is maintained stationary and the nut is rotated relative thereto, the screw will move axially through the nut. In other words, according to the manufacturer, if the screw is fixed, the nut travels, and if the nut is fixed, the screw travels. The conversion of rotary force to linear motion by such anti-friction bearing screws is performed with exceptionally high operating efficiency, allowing the use of smaller power sources, larger loads, or a combination of both.

Referring again to Figs. 3, 4 and 5, the nut 90 is generally in the form of a cylindrical sleeve having integrally formed on the upper open rim thereof a gear 96. The gear 96 is adapted to be driven in one direction by a train of gearing 98 leading from an electric motor M, and the nature of which gearing will be set forth in detail presently. The nut 90, immediately below the gear 96, is rotatable in an opening 100 provided in the bottom plate 102 of a gear train cage structure 104. The bottom plate 102 is suitably supported on ribs 106 formed internally of an open cage-like housing 108. The housing 108 includes vertical side members 110 and 112 and across which there extends a web 114. The lower ends of the side members 110 and 112 are provided with inturned feet or flanges 116 which are clamped in position on the valve cover plate 42 by means of clamping bolts 118. The valve stem 38 passes through an opening 119 provided in the web 114 and is slidably sealed within the opening by means of a sealing ring 120. A coil spring 122 is interposed between the washer 74 and web 114 and opposes the action of the spring 60 as the valve stem 38 moves downwardly to force the valve disc 36 toward its closed position. As will be described in more detail presently, the spring 122 is provided for the purpose of causing the valve disc 36 to close softly on its seat 34 without violent reaction or rebound.

The sleeve portion of the nut 90 is enlarged as at 124 and a reduced apron portion 126 projects downwardly from the enlarged portion, the apron portion serving to protect the feed screw 76 from the accumulation of dirt or other foreign material. A bushing 128 is interposed between the underneath face of the gear 96 and the bottom plate 102 of the gear case 104, while a split retaining ring 130 serves to maintain the nut in operative position on the plate 102 against dislodgment. The feed screw 76 is formed with a helical thread 132 of moderate pitch, the adjacent helices or thread convolutions being separated from each other by relatively wide semi-cylindrical helical grooves 134. The three roller bearings 94 are interposed between the inner cylindrical surface of the nut 90 and the outer threaded surface of the feed screw 76 and each bearing 94 is of spool-shape design with the spool and flanges 136 travelling in the helical groove 134 and with the spindle portion 138 of the bearing bridging the distance between screw threads which are once removed from each other. As best seen in Fig. 5, the inner surface of the nut 90 is provided with an annular rib 140 which projects into the wide annular channel existing between the end flanges 136 of each bearing 94. The three bearings 94 are maintained in their spaced relationship 120° apart by means of the cage member 92 which is in the form of a short cylindrical sleeve having radial openings 142 shaped conformably to the contour of the roller bearings 94 and within which openings the bearings 94 are confined as clearly shown in Fig. 5.

From the above description, it will be seen that upon the application of torque to the nut 90 tending to rotate the same in one direction, the feed screw 76 will travel upwardly through the nut 90, providing, of course, that the feed screw does not itself turn. It will also be observed that after the feed screw 76 has been elevated to the fullest extent of which it is capable, if the nut 90 is held against rotation and the feed screw released so that it may rotate, the latter will travel downwardly through the nut 90 under the influence of the valve biasing spring 60 with the feed screw rotating as it thus moves. The rate of axial downward movement of the feed screw 76 under such circumstances is relatively fast, as is the rate of turning movement of the feed screw. These two principles of operation of the antifriction bearing screw assembly 78 are relied upon according to the present invention for the desired valve movements, these movements being, as previously stated, a relatively slow opening of the valve and almost instantaneous closing movements of the valve when an unsafe condition at or in the vicinity of the furnace burner is encountered.

Turning movements of the feed screw 38 are effected under the control of an electric motor M which operates through the train of gearing 98 to drive the gear 96 in one direction. In the illustrated form of the invention, the motor M is of a unidirectional nature. This motor may be in the form of a conventional induction motor and, since the details of such a motor are well known, they have not been illustrated herein. The motor M includes a stator frame 150, having a sealed winding 152 in one cross leg and having an opening in the other cross leg for a rotor 154. The rotor 154 embodies at its upper end a shaft which constitutes the input shaft of the train of gearing 98, the shaft extending across the cage structure 104 and having its ends journalled in the bottom plate 102 and in a top plate 156 which is supported from the bottom plate 102 by means of spacer assemblies 158. The various gears and gear units associated with the gear train 98 are rotatably supported between the two plates 102 and 156 and these includes gears and pinions designated at 159, 160, 162, 164, 166, 168 and the previously mentioned gear 96, in the order named, extending from the input gear 160 to the gear 96. The gearing just described effects a relatively large gear reduction through the train so that the gear train is self-locking when reverse torque is applied to the gear 96.

Referring now to Figs. 1, 2 and 6, a generally triangular plate 172 is supported on spacer members 174 from the bottom plate 102. A vertically extending rock shaft 176 extends between the two plates 102 and 172 and has mounted thereon for swinging movement in a horizontal plane a pawl-carrying plate 178 on which there is mounted a vertically extending stop pawl 180 in the form of a roller 182 mounted on a spindle 184 extending between a pair of plate flanges 186. The stop pawl 180 is disposed in the medial regions of the plate 178 and is at all times in register with the ratchet wheel 86 carried at the upper end of the feed screw 76, whether the feed screw be in its elevated or its lowered position or in any intermediate position therebetween. The plate 178 is swingable between an advanced position wherein the pawl roller 182 engages the ratchet wheel, and a retracted position wherein this roller is out of contact with the ratchet wheel thus allowing the feed screw 76 to rotate freely.

The swinging plate 178 is normally biased toward its retracted position by means of a spring 190, one end of which is secured to a post 192 carried on the bottom plate 102 and the other end of which is secured to the distal end of the swinging plate 178. The plate 178 is adapted to be moved to its advanced position under the influence of a solenoid S which may be secured by means of screws 194 to a bracket 195 forming a part of the stationary apparatus framework. Accordingly, a spring 196 has one end thereof attached to an ear 198 provided on the movable solenoid plunger 200 and has its other end secured to the distal end of the swinging plate 178. The solenoid S is of conventional design and includes the usual core 202 and winding 204.

The valve stem 38 carries medially thereof a flat disc-like actuating plate 201 designed for engagement with the actuating finger 203 of a limit switch 205 which may be in the form of a conventional micro-switch. The limit switch 205 is vertically slidable in guideways 207 provided on the side wall 112 and is normally biased by a spring 207 to an upper extreme position wherein it abuts against a limit stop 209. The limit switch may be adjusted vertically by means of an adjusting screw 211 which passes through a cover plate 213 and operates on the switch 205 against the action of the spring 207. The limit switch 205 has associated therewith a pair of normally closed contacts C2. The nature and function of the limit switch 205 will be set forth presently.

*Operation of the apparatus*

Figure 7:
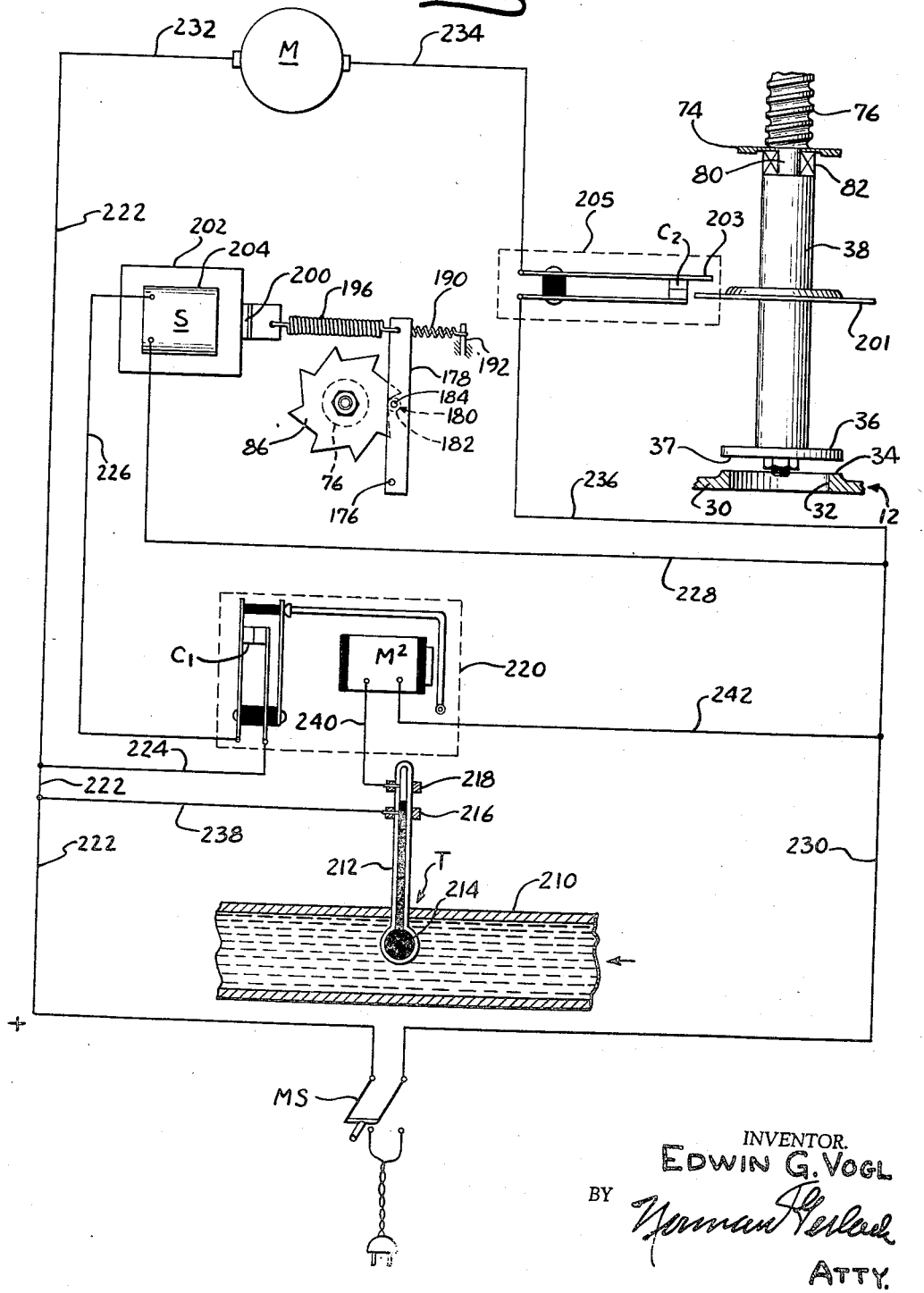
Fig. 7 is a circuit diagram of the control mechanism.

The operation of the apparatus will be facilitated by reference to Fig. 7 in combination with the other views of the drawing. As previously stated, the control apparatus of the present invention is adapted to function quickly to move the valve disc 36 against its seat 34 when an unsafe condition obtains at a burner, within the combustion chamber of a furnace, or at any other remote location. For illustrative purposes, as shown in Fig. 7, this unsafe condition may be reflected by a rise in temperature within a steam or other fluid line of conduit 210. As shown in Fig. 7, when a predetermined maximum degree of temperature within the conduit 210 has been reached, the mercury column 212 associated with a thermostat T, the bulb region 214 of which is interposed in the line, will bridge a pair of contacts 216 and 218 thus establishing a circuit through a relay device 220 which operates in a manner that will be described presently to effect immediate closing of the valve disc 36 against its seat 34. Assuming the furnace which is supplied with fuel through the conduit 210 is in full operation, closure of the master switch MS (Fig. 7) will immediately establish a circuit which extends from the positive side of the line 222 through lead 224, a pair of normally closed contacts C1 associated with the relay device 220, lead 226, solenoid S and lead 228 to the negative side 230 of the line. The solenoid S will thus become energized and cause the stop pawl 180 to move into operative engagement with the ratchet wheel 86, thus holding the feed screw 76 against rotation. At the same time, a circuit will be completed from the line 222, through lead 232, motor M, lead 234, normally closed contacts C2 and lead 236 to the line 230. Energization of the motor M will set the gear train 98 into motion so as to cause rotation of the nut 90 associated with the anti-friction bearing assembly 82 in a direction which will cause the feed screw 76, which is now held against rotation, to move vertically upwardly at a relatively low rate of speed so as to lift the valve disc 36 slowly from its seat 34 and allow fluid to pass through the valve 12 to the apparatus where the fuel is being consumed. During such upward movement of the feed screw 76, the ratchet wheel slides on the roller 182 of the stop pawl 180. At such time as the washer 201 engages the actuating finger 203 of the limit switch 205, representing a condition wherein the valve 12 is fully open, the normally closed contacts C2 will become opened, thus breaking the motor circuit previously described and deenergizing the motor M. At this time, the circuit extending through the solenoid S will remain effective and the entire apparatus will be maintained at a standstill with the valve 12 opened until such time as an unsafe condition is encountered which will cause the mercury column 212 of the thermostat T to bridge the contacts 216 and 218.

When the mercury column 212 of the thermostat T bridges the contacts 216 and 218, a circuit will exist from the line 222 through lead 238, contact 216, column 212, contact 218, lead 240, relay magnet $m2$ and lead 242 to the line 230. Energization of the relay magnet $m2$ will cause opening of the contacts C1 thus breaking the previously described circuit for the solenoid S. Deenergization of the solenoid S will release the solenoid plunger 200 so that the spring 190 may return the plate 178 to its retracted position, thus moving the pawl 180 out of engagement with the ratchet wheel 86 so that the feed screw 76 is free to rotate under the influence of the spring 60 and descend rapidly through the nut 90, thus lowering the valve stems 38 and valve disc 36 quickly to its closed position on the seat 34.

It is to be noted that the ratchet wheel 86 and pawl 180 constitute, in effect, a clutch or braking means for automatically clutching or braking the rotary motion of the feed screw 76 against a fixed reaction member, namely, the stationary framework of the apparatus.

It is to be further noted that during such closing movement of the valve disc 36, the spring 60 will become progressively elongated while the spring 122 will become progressively shorter. In other words, as energy is released by the spring 60 which ordinarily would tend to accelerate the closing movement of the valve disc 36, energy is stored in the spring 122, thus detracting from the total energy released by the spring 60 so that a cushioning action will result and the valve disc 36 will not slam against the seat 38 on closing thereof.

An alternative method of preventing hard seating of the valve disc 36 resides in the provision of means whereby the feed screw 76 may overrun the nut 90 after the valve disc 36 has become seated. Accordingly, the upper rim of the cage element 92 is formed with a series of ratchet ramps 250 thereon presenting sharp drop-off shoulders 252. The ramps 250 are designed for engagement with a pin 254 which is received within a hole 256 provided diametrically in the feed screw 76 immediately below the ratchet wheel 86 when the feed screw has moved downwardly through the nut 90 to the fullest extent of which it is capable of moving and as limited by engagement of the valve disc 36 has become seated on the valve seat 38.

While one specific embodiment of a valve control mechanism constructed in accordance with the principles of the present invention has been shown and described herein for illustrative purposes, it will be understood that the illustrated form of the invention does not indicate all the different forms of apparatus suitable for the functions intended, the form illustrated being only one of those which have been developed for commercial application. For example, while the valve 12 and the system with which they are employed are stated herein to be for the purpose of supplying fuel gas to a combustion chamber, other forms of valves and systems are contemplated. If desired, the valve 12 may take the form of a proportioning valve for the mixing of combustible gases, a gas and a liquid, etc. in which certain modifications such as the use of a reversible motor may be resorted to. Therefore, only insofar as the accompanying claims are concerned is the invention to be limited.

Having thus described the invention what I claim as new and desire to secure by Letters Patent is:

1. Control mechanism operative to effect movement of an element between a first and a second position and comprising means normally biasing said element toward its first position, a nut mounted for rotation about an axis, means maintaining said nut against axial shifting movement, a rotatable and axially shiftable feed screw permanently and threadedly received through said nut and rotatably connected at one end thereof to said element, releasable clutch means operable when engaged to prevent rotation of said feed screw while allowing axial shifting movement thereof, an electric motor operatively connected to said nut in driving relationship and operable when said clutch means is engaged to rotate the nut in a direction to move the feed screw axially and force said element toward said second position against the action of said biasing means, means for simultaneously energizing said motor and engaging said clutch means, and means automatically operable when said element reaches said second position to deenergize said motor.

2. Control mechanism for effecting movement of an element between a first and second position, said mechanism comprising means normally biasing said element toward its first position, a nut mounted for rotation about an axis, means maintaining said nut against axial shifting movement, a rotatable and axially shiftable feed screw permnently and threadedly received through said nut and rotatably connected at one end thereof to said element, releasable clutch means operable when engaged to prevent rotation of said feed screw while allowing axial shifting movement thereof, a solenoid operable when energized to effect engagement of said clutch means, an electric motor operatively connected to said nut in driving relationship and operable when said clutch means is engaged to rotate the nut in a direction to move the feed screw axially and force said element toward said second position against the action of said biasing means, means for simultaneously energizing said motor and solenoid, and means automatically operable when said element reaches said second position to deenergize said motor.

3. Control mechanism as set forth in claim 2 and wherein said clutch means comprises a ratchet wheel mounted on the other end of the feed screw, a holding pawl movable into and out of holding engagement with said ratchet wheel, means normally biasing said holding pawl so that it is out of holding engagement with said ratchet wheel, a plunger for said solenoid, and means operatively connecting said plunger and holding pawl for movement in unison.

4. A control mechanism of the character described comprising, in combination, a fluid flow controlling member movable between first and second controlling positions, a nut mounted for rotation about an axis, means maintaining said nut against axial shifting movement, a rotatable and axially shiftable feed screw permanently and threadedly received through said nut and rotatably connected at one end to said element, a first clutch element fixedly secured to the other end of said feed screw, a second clutch element movable into and out of engagement with said first clutch element and operable when in such engagement to prevent rotation of the first clutch element while permitting axial shifting thereof, means normally biasing said second clutch element so that it is out of holding engagement with said first clutch element, an electric motor operatively connected to said nut in driving relationship and operable when said clutch elements are in engagement to rotate said nut in a direction to move the feed screw axially and shift said controlling member toward one of said positions, electrically operable means adapted when energized to move said second clutch element into frictional holding engagement with said first clutch element against the action of said biasing means, means for simultaneously energizing said motor and electrically operable means, and means automatically operable when said controlling member reaches said one position for deenergizing said motor.

5. In a control mechanism of the character described, the combination set forth in claim 4 wherein said electrically operable means comprises a solenoid, a plunger for said solenoid, and means operatively connecting said plunger and second clutch element for movement in unison.

6. Control mechanism for effecting relatively slow movement of an element away from a first safe position toward which it is biased toward a second active position and for allowing relatively quick return of the element to its safe position due to such biasing thereof, said control mechanism comprising in combination a first rotatable threaded member rotatably connected to said element, a second rotatable threaded member in threaded engagement with said first threaded member, means mounting said second threaded member for rotation about an axis while preventing axial shifting of the second threaded member, releasable clutch means operable when engaged to prevent rotation of the first threaded member while allowing axial shifting movement thereof, an electric motor operatively connected to said second threaded member in driving relationship and operable when said clutch means is engaged to rotate the second threaded member in a direction to move the first threaded member axially and force said element toward its active position, means for simultaneously energizing said motor and engaging said clutch means, and means automatically operable when said element reaches its active position to deenergize said motor.

7. Control mechanism as set forth in claim 6 and wherein said clutch means comprises a ratchet wheel mounted on and bodily movable with said first threaded member, a holding pawl movable into and out of sliding holding engagement with said ratchet wheel, a plunger for said solenoid, and means operatively connecting said plunger and holding pawl for movement in unison.

References Cited in the file of this patent
UNITED STATES PATENTS

| | | |
|---|---|---|
| 2,052,947 | Shivers | Sept. 1, 1936 |
| 2,052,987 | Persons | Sept. 1, 1936 |
| 2,276,195 | Holmes | Mar. 10, 1942 |
| 2,629,264 | Kron | Feb. 24, 1953 |